United States Patent
Bradley et al.

[11] 3,758,161
[45] Sept. 11, 1973

[54] REINFORCED WHEEL RIM
[75] Inventors: John N. Bradley, Grosse Pointe Woods; J. Edward Haug, Grosse Pointe Farms, both of Mich.
[73] Assignee: The Budd Company, Philadelphia, Pa.
[22] Filed: Aug. 2, 1971
[21] Appl. No.: 168,308

[52] U.S. Cl........... 301/63 R, 152/DIG. 9, 152/378, 152/396
[51] Int. Cl............................................. B60b 1/06
[58] Field of Search...................... 301/63 R, 96, 97; 152/378–383, 396–410, DIG. 9, DIG. 10

[56] References Cited
UNITED STATES PATENTS
| | | | |
|---|---|---|---|
| 3,494,404 | 2/1970 | Parr | 152/409 |
| 1,989,188 | 1/1935 | Frank | 152/407 X |
| 1,576,117 | 3/1926 | Guthrie | 301/96 X |
| 1,718,874 | 6/1929 | Paull | 152/381 X |
| 1,264,957 | 5/1918 | Mitchell | 152/379 |

Primary Examiner—Albert J. Makay
Attorney—Thomas I. Davenport et al.

[57] ABSTRACT

A rim for supporting a tire on a wheel having reinforcing ring means secured thereto to provide additional strength to the rim in high stress areas.

4 Claims, 2 Drawing Figures

PATENTED SEP 11 1973 3,758,161

INVENTORS
JOHN N. BRADLEY
BY J. EDWARD HAUG

*A. L. Truex Jr.*
ATTORNEY

REINFORCED WHEEL RIM

This invention relates to vehicle wheels and more particularly to the rim of a vehicle wheel for supporting a tire mounted thereon.

Current practice in wheel rim manufacturing is to roll form a strip of stock, cut to length and weld the ends together to provide the rim ring for the wheel. In such forming operations, very little metal flow is encountered and the thickness of the rim is substantially equal throughout. Thus, the required thickness of the rim material must be determined by the amount of material required to resist the forces at the highest stressed areas.

It is an object of this invention to reduce the thickness of the rim material and reinforce the higher stressed areas, thus realizing a savings in material and a reduction in the weight of the wheel.

A further object of this invention is to provide a reinforcing ring having an outer surface compatible with the inner surface of the wheel rim at the high stresses area for being attached to the wheel rim for reinforcing the rim at that point.

Another object of this invention is to provide various joining means for securing the reinforcing ring to the rim.

These and other objects of this invention will become more apparent as reference is made to the following specification and drawings wherein.

Figure 1:
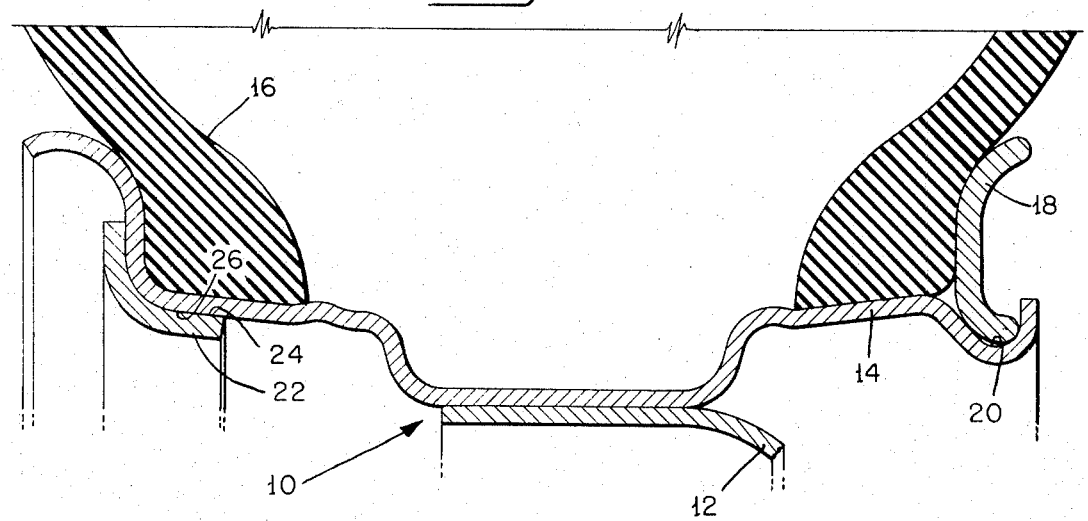
FIG. 1 is a cross-sectional view of a vehicle wheel having a tire mounted thereon, with portions broken away, and including a reinforcing ring attached to the rim in an area of high stress.
Figure 2:
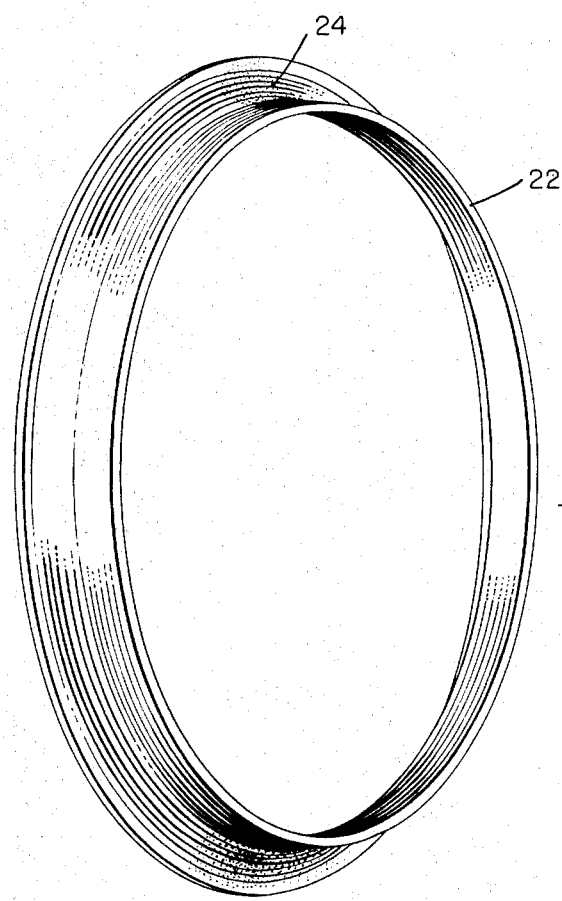
FIG. 2 is an isometric view of a reinforcing ring.

Referring now to the drawings, as best seen in FIG. 1, a vehicle wheel 10 includes a disk 12 with a rim 14 secured thereto. A tire 16 is mounted on the rim 14 and secured in place by a C ring 18 supported in the gutter 20 of the rim 14. A reinforcing ring 22 having an outer surface 24 compatible to the inner surface 26 of the rim 14 is secured to the rim by any conventional means such as welding, brazing, riveting or adhesive bonding.

The location of the reinforcing ring 22 on the rim 14 is easily determined by conventional testing means. Once the area requiring reinforcing has been determined, the reinforcing ring 22 of the required thickness to resist the excess stress of the area is formed with an outer surface 24 compatible to the inner surface 26 of the rim and then the reinforcing ring is secured to the rim.

The reinforcing ring 22 may be secured to the rim 14 by a series of welds extending between the adjacent surfaces 24, 26 or by a brazing metal applied between the surfaces in a normal brazing operation. If the application of the heat required to weld or braze the reinforcing ring to the rim reduces the strength of the rim too much by partial annealing of the cold worked rim, a high strength adhesive such as epoxy resins could be used to join the reinforcing ring to the rim.

While but one reinforcing ring 22 has been shown attached to the rim 14, stress testing may indicate the need for more than one reinforcing ring, and variations and modifications of this invention may be made without departing from the scope of the following claims.

We claim:

1. In a vehicle wheel having a disk with attaching means for securing said wheel to a vehicle and a rim secured to said disk including a side ring for supporting and having a tire mounted thereon, said rim having an inner surface at a high stressed area, a separate reinforcing ring having a matching outer surface for matingly engaging said inner surface of said rim, said ring secured only to said rim at the mating surfaces for strengthening said rim at the high stressed area, and joining means for securing said surfaces together.

2. The vehicle wheel as claimed in claim 1 wherein said joining means includes a series of welds extending between said surfaces for securing said reinforcement ring to said rim.

3. The vehicle wheel as claimed in claim 1 having said joining means comprising a high strength adhesive applied between said surfaces for joining said reinforcement ring to said rim.

4. The vehicle wheel as claimed in claim 1 wherein said joining means includes brazing metal applied between said surfaces for securing said reinforcement ring to said rim.

* * * * *